United States Patent
Lemery

[15] 3,670,984
[45] June 20, 1972

[54] LINE PICK-UP FOR FISHING REELS

[72] Inventor: Jean-Paul Lemery, Cluses, France

[73] Assignee: Carpano & Pons, Cluses, France

[22] Filed: June 18, 1970

[21] Appl. No.: 47,391

[30] Foreign Application Priority Data

June 20, 1969 France..................................6920777

[52] U.S. Cl. ......................................................242/84.2 G
[51] Int. Cl. ...........................................................A01k 89/00
[58] Field of Search ....................242/84.2 G, 84.2 R, 84.21, 242/84.21 W, 84.26, 84.2 R, 84.21 K

[56] References Cited

FOREIGN PATENTS OR APPLICATIONS 1,096,590  2/1955  France..............................242/84.2 G
1,506,359  11/1967 France..............................242/84.2 G
1,261,980  4/1961  France..............................242/84.2 G
1,238,987  7/1960  France..............................242/84.2 G Primary Examiner—Billy S. Taylor
Attorney—Robert E. Burns and Emmanuel J. Lobato

[57] ABSTRACT

A line pick-up device for a fishing reel comprises a semicircular body having an end reduced in size with respect to the remainder of the body, a plastic cone molded over the reduced-size end and diverging in a direction towards the end tip of the reduced-size end, and line guiding means at the end tip of the reduced-size end and adjacent the base of the plastic cone for guiding a fishing line during winding thereof on the fishing reel. The line guiding means comprises either a fixed or rotatable flared member.

6 Claims, 3 Drawing Figures

LINE PICK-UP FOR FISHING REELS

The present invention relates to a line pick-up device for fishing reels.

Fishing reels with a fixed barrel are generally fitted with a line pick-up device having the general shape of a basket handle and when casting with such fishing reels, the fisherman releases the pick-up so that the spool and its line are entirely free. Therefore when the fisherman releases the line, nothing opposes casting out. For recuperation of the line, when the fisherman operates the winding handle, a locking mechanism is then released and a recall mechanism pivots the pick-up to its operative position. The line is then guided by the pick-up on to a pulley where it remains during the winding operation.

According to another type of reel, a free pulley or fixed bearing surface is located where the line is bent around in order to be wound onto the reel. Of course, a free pulley facilitates the change of direction of the line.

In order for a pick-up device to function correctly during winding, it is important that the line not encounter any obstacle in its path during transfer from the pick-up to the roller from where, after a change of direction of about 90°, it is wound onto the reel. The roller is usually of a greater diameter than the pick-up bar, so that an enlarged conical section is provided to lead the line, without any impediment, onto the roller or bearing surface. It is thus a requirement that the connections between the cylindrical and conical parts of the rod be perfectly smooth.

Certain manufacturers cast the pick-up bar and conical section in one piece and then treat the piece by fine machining or burnishing. These methods are very costly.

The pick-up bar can also be produced by assembling two pieces: a metallic bar and metallic cone, the latter being either brazed, screwed or force fitted on to the bar. In such a pick-up device it is practically impossible to ensure continuity of the surface in the path of the line when the pick-up is actuated so that the risk of fraying the line is great and costly. In addition finishing operations (polishing, surface treatments and so on) are necessary.

It is an object of the invention to provide a pick-up device which obviates the aforementioned drawbacks.

It is a further object of the invention to provide a pick-up device with which the line can be correctly guided, without danger of damage thereto, and which can be simply manufactured at a low cost.

Another object of the invention is to enable a roller to be fitted to the pick-up in a manner whereby resistance to rotation of the roller is minimized.

According to the invention a line pick-up device for a fishing reel comprises an elongated body of substantially semi-circular shape, a substantially conical member composed of plastic flaring out at one end of the body, and a bearing member adjacent the outer end of the conical member for guiding a line.

The invention will now be described in more detail, by way of example, with reference to the accompanying drawings, in which.

Figure 1:
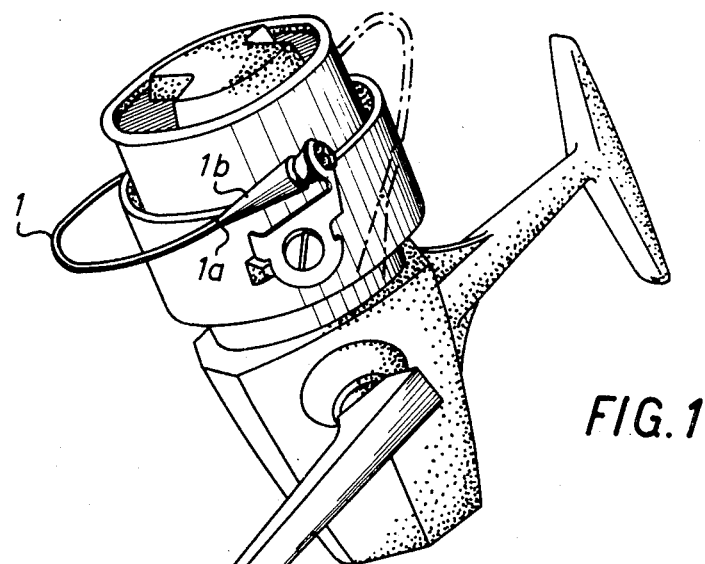
FIG. 1 is a perspective view of a fishing reel provided with a pick-up device according to the invention.

Referring to FIG. 1, the pick-up device 1, having the general shape of a basket handle, terminates at one end with a conical part 1b and a roller. The junction point 1b between the tubular and conical parts of the pick-up must be such that the line can move from the tubular part to the conical part without encountering any obstacle. The roller is of generally smaller diameter than the end of the cone, so that transfer from the cone to the roller causes no hindrance.

Figure 2:
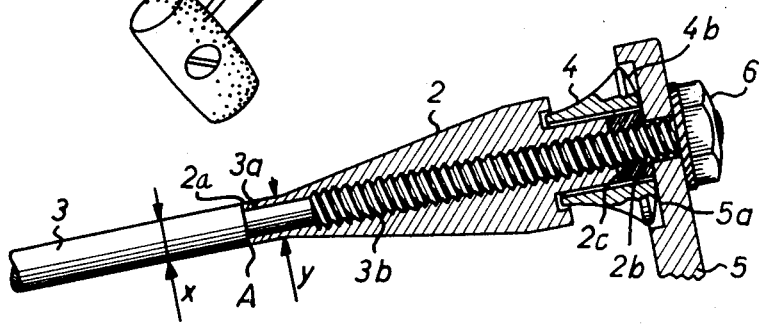
FIG. 2 is an enlarged-scale cross section through an end of the pick-up device of FIG. 1.

The junction between the conical and tubular parts of the pick-up is shown in detail in FIG. 2. The elongated tubular part comprises a metal rod 3 of circular cross section having a diameter $x$ and terminating with a part 3a of reduced diameter and a threaded part 3b.

A conical member or part 2 is moulded in plastics material over parts 3a and 3b and encircles the part 3b. Conical part has a substantially cylindrical apex end section or portion 2a abutting at A against the shoulder between the rod 3 and part 3a. After molding, the plastics material shrinks so that the diameter $y$ of the apex end section 2a is slightly less than the diameter $x$ to facilitate the sliding movement of the fishing line. Hence, there is no possibility of catching of the line at A as it passes from the elongated body 3 onto conical part 2.

The base end of the conical part 2 has a cylindrical projection or extension ending in a shoulder 2c and having a diameter substantially less than the largest part of the cone. A threaded metallic bush 2b, having the same diameter as shoulder 2c is screwed thereagainst to prevent any damage by buckling or cracking of the extension due to axial compression.

Conical part 2 is thus firmly held on rod 3, and cannot move either longitudinally or rotationally in relation thereto. Line guiding means comprising a flared roller 4 is rotatably mounted on the extension to part 2 and is held by an arm 5 abutting against bush 2b and fixed by a nut 6 screwed onto threaded part 3b. Arm 5 enables the pick-up to be pivotally mounted on a fishing reel, as can be seen from FIG. 1.

At least the projection or extension to part 2 is in a plastics material having a low coefficient of friction with the material of roller 4, advantageously provided in the same material, for example graphited polyamide.

Flared roller 4 has a spherical outer surface 4b which, during rotation of the roller, bears against a surface 5a of arm 5. The smaller end of roller 4 engages in a recess of the outer wall of conical part 2, which enables the roller 4 to be mounted with a slight axial play without any possibility of catching of the line. Roller 4 is thus able to rotate with the very minimum of resistance.

Figure 3:
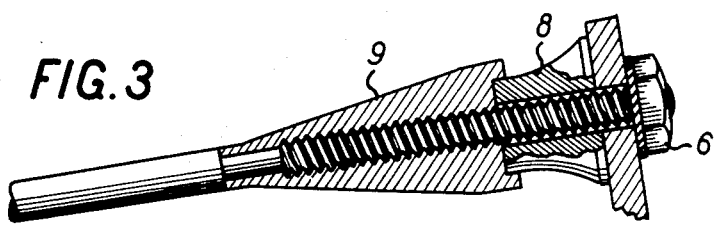
FIG. 3 is a view similar to FIG. 2 for a modified pick-up device.

In the embodiment of FIG. 3, the roller is replaced by a fixed bearing member 8 having a similar flared shape. The extension ending with shoulder 2a and bush 2b are also eliminated from this embodiment. As before, the pick-up is fixed to an arm by a nut 6. Roller 4 is made in plastics material, for example graphited polyamide, having a low coefficient of friction with the line, whilst conical part 9 can be made of a less expensive plastics material. Alternatively, it would be possible to mould the conical part 9 and bearing member 8 in one piece.

What is claimed is:

1. A line pick-up device for guiding a fishing line of a fishing reel comprising: an elongated body having a substantially semi-circular configuration and having an end portion smaller in cross-sectional size than the remaining portion of said elongated body; a conical member composed of plastic material connected to and encircling said end portion and diverging in an axial direction towards the end tip of said end portion, said conical member having an apex portion smaller in cross-sectional size than the remaining portion of said elongated body to facilitate the sliding movement of a fishing line from said elongated body onto said conical member and having a base portion larger in cross-sectional size than that of said remaining portion of said elongated body; and line guiding means adjacent said base portion of said conical member and cooperative therewith for guiding the fishing line during winding thereof on a fishing reel.

2. A line pick-up device according to claim 1; wherein said conical member has a projection extending outwardly in said axial direction from said base portion and wherein said line guiding means comprises a roller rotatably mounted on said projection.

3. A line pick-up device according to claim 2; including means mounting said roller for both axial movement along said projection and rotational movement around said projection.

4. A line pick-up device according to claim 1; wherein said line guiding means comprises a flared guiding member connected to and projecting outwardly in said axial direction from said base portion and being flared outwardly in said axial direction.

5. A line pick-up device according to claim 1; wherein said tip end of said elongated body end portion is threaded to enable attachment of said line pick-up device to a fishing reel.

6. A line pick-up device according to claim 1; wherein said conical member is moulded onto said end portion.

* * * * *